(No Model.)
G. C. STANLEY.
STOP SHUTTER OR DIAPHRAGM LIGHT CONTROLLER FOR PHOTOGRAPHIC CAMERAS.
No. 363,429. Patented May 24, 1887.
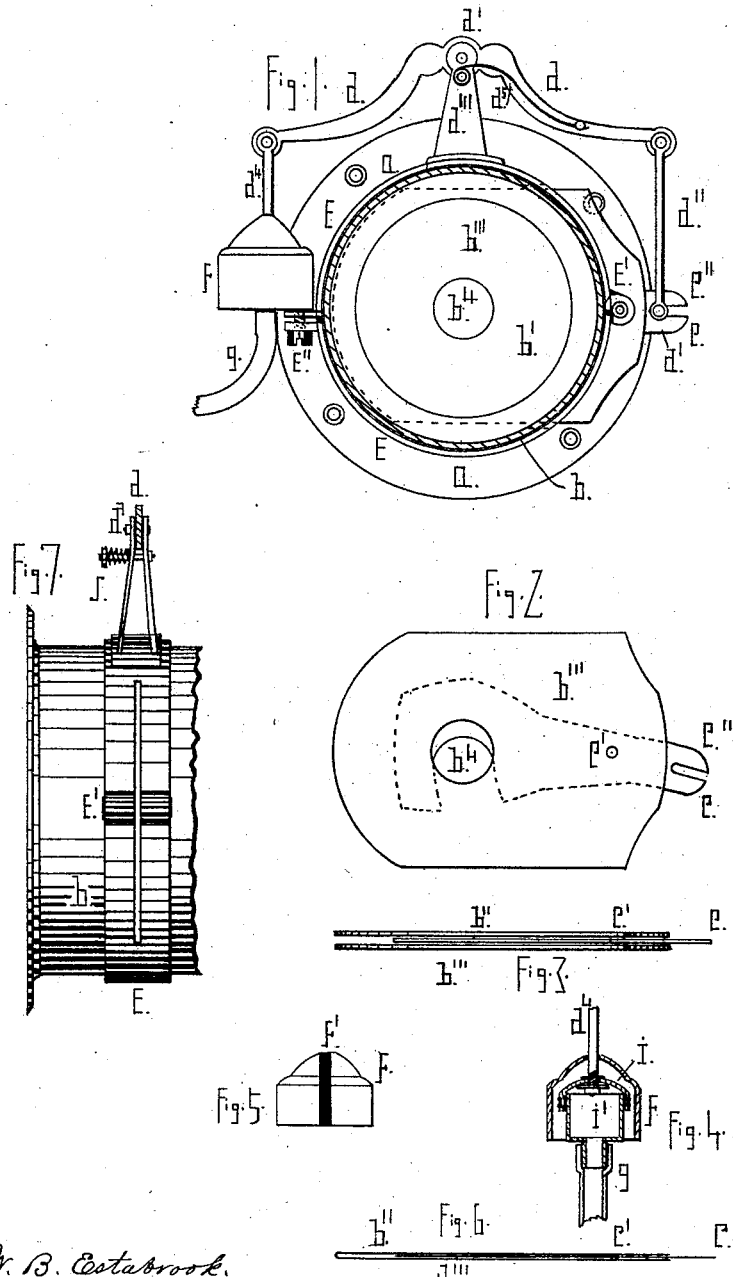

UNITED STATES PATENT OFFICE.

GEORGE CHAMBERLIN STANLEY, OF ITHACA, NEW YORK.

STOP-SHUTTER OR DIAPHRAGM LIGHT-CONTROLLER FOR PHOTOGRAPHIC CAMERAS.

SPECIFICATION forming part of Letters Patent No. 363,429, dated May 24, 1887.

Application filed March 29, 1886. Serial No. 196,882. (No model.)

*To all whom it may concern:*

Be it known that I, GEORGE CHAMBERLIN STANLEY, a citizen of the United States, and a resident of Ithaca, Tompkins county, New York, have invented an Improved Stop-Shutter or Light-Controller for Photographic Lenses, of which the following is a specification, reference being had to the accompanying drawings.

My object is to construct a diaphragm and shutter in one article or device, the same being used in the central space between the camera-lenses in the usual slot of the lens-tube, and to operate the shutter in the diaphragm by mechanical means, as will be apparent as I describe my invention.

Figure 1 is a front elevation of a lens-tube with my diaphragm in it. Fig. 2 is a view of my diaphragm removed out of the tube. Fig. 3 is a view of the edges of the plates and shutter of my diaphragm, the thickness of the plates being exaggerated. Fig. 4 is a view of the rubber air-valve in section. Fig. 5 is a view of the metal cap that covers the valve. Fig. 6 shows the actual thickness of the plates of the diaphragm and shutter more correctly; and Fig. 7 is a side elevation (shaded) of the band or ring $e$ on the lens-tube, and showing the diaphragm-slot through the band and lens-tube.

In the figures, $a$ represents the screw-plate by which the camera lens-tube is made fast to the camera, and $b$ is the lens-tube, represented cut in two in the central space between the lenses just in front of the usual place for the diaphragm-slot of the lens-tube.

My diaphragm is made with a rear plate, $b''$, Fig. 3, and a front plate, $b'''$, between which plates or parts the shutter $c$ is inserted, and pivoted by the pin-axis $c'$, which, since the shutter is delicately fitted in its place and on this axis, provides for a free and easy motion. An arm, $c''$, projects beyond the plates and has a slot cut in it, in which is placed the pivot-pin of the lower end of the rod $d''$, connected by its upper end with one end of the lever $d$, which lever has the pivot-fulcrum $d'$ on the post $d'''$, which is fast to the ring or band $e$, by which the lever is clamped to the tube $b$. The other end of the lever is pivoted to the connecting-rod $d^4$, which rod at its lower end is fast to the rubber valve in the drum $f$. This rubber piston-valve $i$ is made in its usual form by an air-chamber, $i'$, Fig. 4, with a small air-tube connecting with the usual rubber hand air-ball by the rubber tube $g$, which rubber hand air-ball furnishes the usual air impulse to the rubber valve. The rod $d^4$, fast to the valve, is impelled upward when the ball is compressed by the hand of the operator, and the transmitted impulse, through the lever $d$, reaches the shutter of the diaphragm. These impulses so communicated are very rapid and delicate, and open or shut the aperture $b^4$ of the diaphragm quickly or by intervals of any desired lengths of time, thus giving lengths of exposure to light of the negative such as the operator desires, long or short.

The clamping-ring $e$ has a hinge, $e'$, and a fixing-screw, $e''$, which hinge and set-screw enable the operator to fasten on the tube the described parts and to remove them from the tube $b$ at pleasure without in the least altering or injuring the tube. The use of the slot in the end $c''$ of the shutter of the three-parted diaphragm is to enable this ring and its connected parts to be removed, and is also useful when the diaphragm is changed for any reason.

In Fig. 4 the rubber valve is seen in section, having the air-chamber $i'$, the rubber cap or valve $i$, the rubber tube $g$, fast to the downward-projecting metallic pipe projection, the attached rod $d^4$ above the valve, and the outer cover, $f$, which cover in Fig. 5 is seen to have a slot, $f'$, by means of which, raising the cover upward on the rod $d^4$ above the valve, it can be taken off and put on over the valve and its immediate attached parts. There are represented sections of the wires about the rubber cap or valve (in Fig. 4) that hold the rubber air-tight to the air-chamber. In Fig. 2 the pivot-pin or axis $c'$ of the shutter is seen, and the general shape desirable for the shutter to have is seen or indicated by dotted lines. The rubber valve acts as a powerful means of opening and closing the shutter; but to make the movements of the shutter more certain I attach a spring, $d^5$, to the post $d'''$, with its bearing on the lever $d$. The hand-ball is not represented, because it is well known in photography and in the arts to be a simple hand-ball, which, when compressed, forces air through the tube $g$, and when released of the grasp of the hand expands quite strongly, thus exhausting the air beneath the valve. All other parts of my device are believed to be fully apparent.

What I claim is—

1. The combination of the diaphragm-plates $b''\ b'''$, placed between the lenses of a camera, with the slotted shutter $c$, pivoted between said plates, substantially as described.

2. The clasping-ring $e$, adapted to and supporting a pivoted lever by clasping a lens-tube, in combination with a lever and a shutter, which shutter operates in connection with the aperture of a diaphragm of a lens-tube, as set forth.

3. The shutter $c$, pivoted to the central diaphragm of a lens-tube and inserted between the lenses of a camera on the inside of the lens-tube, and there operated to open and shut the aperture of the diaphragm, as set forth.

4. The ring about the lens-tube, provided with a rubber air-valve attached to one side of the ring, and a connecting-lever, $d$, attached to the top of the ring, and a shutter, $c$, whose outer end projects out of the lens-tube on the other side and connects with the lever, as shown and described.

GEORGE CHAMBERLIN STANLEY.

Witnesses:
S. J. PARKER,
W. B. ESTABROOK.